US009928179B2

(12) United States Patent
Avudaiyappan et al.

(10) Patent No.: US 9,928,179 B2
(45) Date of Patent: Mar. 27, 2018

(54) CACHE REPLACEMENT POLICY

(75) Inventors: Karthikeyan Avudaiyappan, Sunnyvale, CA (US); Mohammad Abdallah, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 676 days.

(21) Appl. No.: 14/385,968

(22) PCT Filed: Dec. 16, 2011

(86) PCT No.: PCT/US2011/065584
§ 371 (c)(1),
(2), (4) Date: May 7, 2015

(87) PCT Pub. No.: WO2013/089786
PCT Pub. Date: Jun. 20, 2013

(65) Prior Publication Data
US 2015/0286576 A1    Oct. 8, 2015

(51) Int. Cl.
*G06F 12/08*  (2016.01)
*G06F 12/12*  (2016.01)
(Continued)

(52) U.S. Cl.
CPC ...... *G06F 12/0897* (2013.01); *G06F 12/0859* (2013.01); *G06F 12/0891* (2013.01);
(Continued)

(58) Field of Classification Search
CPC ............ G06F 12/0897; G06F 12/0859; G06F 12/0891; G06F 12/126; G06F 12/124;
(Continued)

(56) References Cited

U.S. PATENT DOCUMENTS 5,860,117 A * 1/1999 Cherabuddi ........ G06F 12/0804
710/39
6,226,713 B1 * 5/2001 Mehrotra ............ G06F 12/0859
711/109
(Continued)

FOREIGN PATENT DOCUMENTS

CN    101694640 A    4/2010
TW    200933522 A    8/2009
TW    201140319 A    11/2011

OTHER PUBLICATIONS

International Preliminary Report on Patentability for Application No. PCT/US2011/065584, dated Jun. 26, 2014, 5 pages.
(Continued)

*Primary Examiner* — Mano Padmanabhan
*Assistant Examiner* — William E Baughman
(74) *Attorney, Agent, or Firm* — NDWE LLP

(57) ABSTRACT

Cache replacement policy. In accordance with a first embodiment of the present invention, an apparatus comprises a queue memory structure configured to queue cache requests that miss a second cache after missing a first cache. The apparatus comprises additional memory associated with the queue memory structure is configured to record an evict way of the cache requests for the cache. The apparatus may be further configured to lock the evict way recorded in the additional memory, for example, to prevent reuse of the evict way. The apparatus may be further configured to unlock the evict way responsive to a fill from the second cache to the cache. The additional memory may be a component of a higher level cache.

17 Claims, 2 Drawing Sheets

100

(51) Int. Cl.
*G06F 12/0897* (2016.01)
*G06F 12/0855* (2016.01)
*G06F 12/126* (2016.01)
*G06F 12/0891* (2016.01)
*G06F 12/123* (2016.01)

(52) U.S. Cl.
CPC .......... *G06F 12/126* (2013.01); *G06F 12/124* (2013.01); *G06F 2212/1008* (2013.01); *G06F 2212/152* (2013.01); *G06F 2212/251* (2013.01); *G06F 2212/301* (2013.01)

(58) Field of Classification Search
CPC ........... G06F 2212/1008; G06F 12/152; G06F 12/251; G06F 12/301; G06F 12/69

See application file for complete search history.

(56) References Cited

U.S. PATENT DOCUMENTS

| | | |
|---|---|---|
| 2002/0010839 A1 | 1/2002 | Tirumala et al. |
| 2004/0221110 A1 | 11/2004 | Rowlands et al. |
| 2005/0044320 A1* | 2/2005 | Olukotun .............. G06F 9/3824 711/118 |
| 2007/0204121 A1* | 8/2007 | O'Connor ............. G06F 12/126 711/163 |
| 2010/0070712 A1 | 3/2010 | Arimili et al. |
| 2011/0258391 A1* | 10/2011 | Atkisson ............... G06F 11/108 711/118 |

OTHER PUBLICATIONS

International Search Report and Written Opinion for Application No. PCT/US2011/065584, dated Aug. 29, 2012, 6 pages.

* cited by examiner

CACHE REPLACEMENT POLICY

FIELD OF INVENTION

Embodiments of the present invention relate to the field of processor design. More specifically, embodiments of the present invention relate to systems and methods for cache replacement policies.

BACKGROUND

A processor cache, whether used for instructions or data or both, is inherently of a finite capacity or size. When a cache is "full," e.g., all possible cache memory locations are utilized, a determination must be made of which information to discard, or "evict," in order to add new information to the cache. The mechanism or "rule" for making such a determination is known as or referred to as a "replacement policy."

An ideal replacement policy would be to always evict the information that will not be used (again) for the longest time period. As a practical matter, it is impossible to know when information will be needed in the future. Hence, many replacement policies make predictions based on the age, or time since last use, of cached information.

One such replacement policy is known as or referred to as "Least Recently Used (LRU)." An LRU replacement policy discards or evicts the least recently used cache items first. An LRU replacement policy generally requires keeping track of what was used when, which may be considered expensive in terms of storage and processing time if a system wants to make sure the algorithm always discards the uniquely least recently used item.

An alternative replacement policy is known as or referred to as "Pseudo Least Recently Used (PLRU)." A PLRU replacement policy generally discards or evicts one of, or approximately the oldest cached items, although the discarded item may not be the uniquely least recently used item. A PLRU replacement policy generally trades a lack of evicting exactly the least recently used cached item in favor of reduced storage and processing time.

Unfortunately, conventional PLRU replacement policies are generally insufficient for a computer system requiring multiple cache look up requests in the same clock cycle.

SUMMARY OF THE INVENTION

Accordingly, a need exists for a cache replacement policy for caches that allow multiple cache look up requests in the same clock cycle.

Therefore, what is needed are systems and methods for cache replacement policies. What is additionally needed are systems and methods for cache replacement policies that enable multiple cache look up requests in the same clock cycle. A further need exists for systems and methods for cache replacement policies that are compatible and complementary with existing systems and methods for cache design and operation. Embodiments of the present invention provide these advantages.

In accordance with a first embodiment of the present invention, an apparatus comprises a queue memory structure configured to queue cache requests that miss a second cache after missing a first cache. The apparatus comprises additional memory associated with the queue memory structure is configured to record an evict way of the cache requests for the cache. The apparatus may be further configured to lock the evict way recorded in the additional memory, for example, to prevent reuse of the evict way. The apparatus may be further configured to unlock the evict way responsive to a fill from the second cache to the cache. The additional memory may be a component of a higher level cache.

In accordance with a method embodiment of the present invention, a lookup request is received at a first cache. Responsive to a miss of the request at the first cache, the request is forwarded to a second cache. The second cache is at a higher level of a memory hierarchy than the first cache. Responsive to a miss of the request at the second cache, the request is forwarded to a second cache miss queue. An evict way for the first cache corresponding to the request is determined. The evict way is stored in the second cache miss queue. The determination of the evict way may occur contemporaneously with the forwarding the request to the second cache. The evict way may be locked to prevent reuse of the evict way. The evict way may be unlocked responsive to filling the request from the second cache.

In accordance with other embodiments of the present invention, a computer system comprises a cache subsystem configured to choose an evict way for a missed request to a first cache on the same clock cycle that the request accesses a next higher level of memory. The computer system may be further configured to prevent reuse of the evict way prior to filling the request.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not drawn to scale.

DETAILED DESCRIPTION

Figure 1:
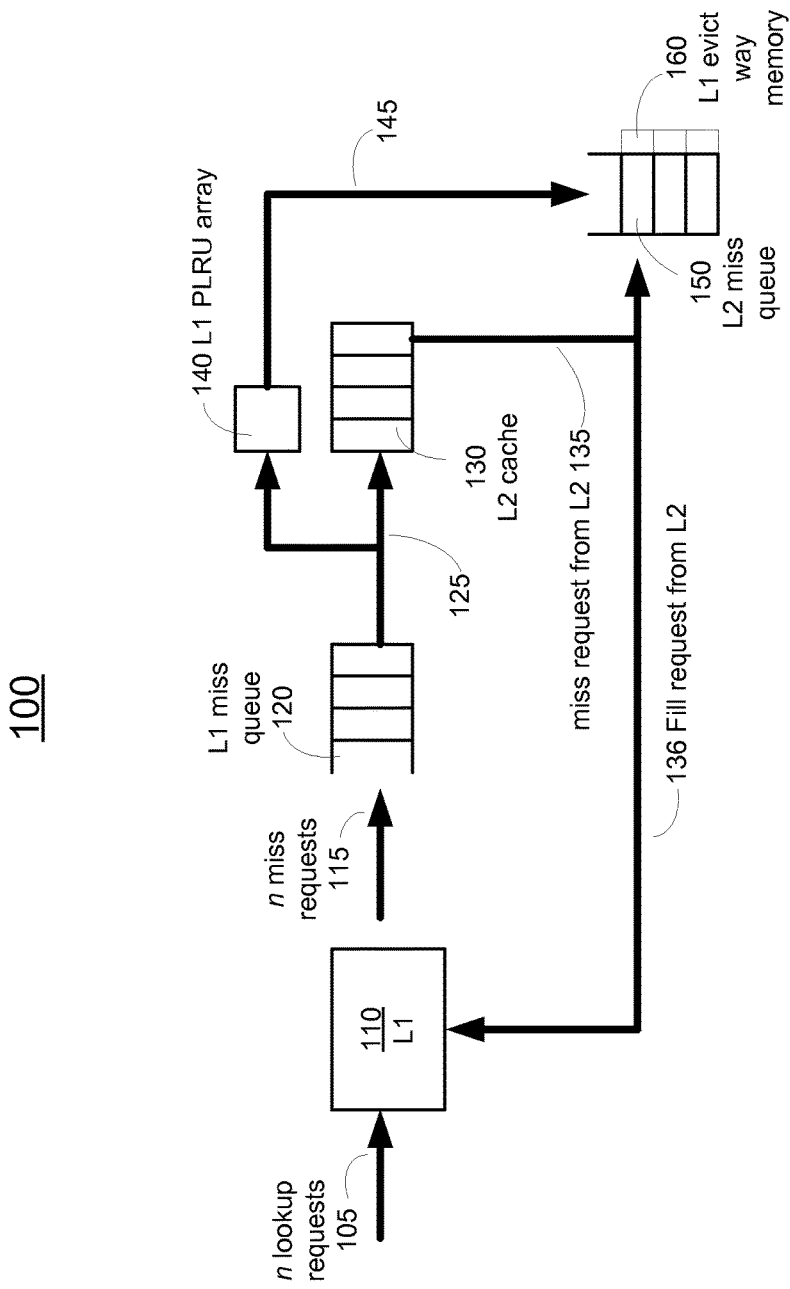
FIG. 1 illustrates a data flow diagram for a cache replacement policy, in accordance with embodiments of the present invention.

Reference will now be made in detail to various embodiments of the invention, cache replacement policy, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that may be performed on computer memory.

These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "performing" or "generating" or "adjusting" or "creating" or "executing" or "continuing" or "indexing" or "processing" or "computing" or "translating" or "calculating" or "determining" or "measuring" or "gathering" or "running" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Cache Replacement Policy

Exemplary embodiments in accordance with the present invention are described herein in terms of a Level 1 cache, referred to or described as "L1." A next level of cache, generally described as a "higher" level of cache, may be referred to or described as a Level 2 cache, or "L2." It is to be appreciated that embodiments in accordance with the present invention are well suited to all types of caches, e.g., instruction caches, data caches, pre-fetch caches, translation lookaside buffers (TLB) and the like, as well as to caches at other levels of a cache hierarchy.

Consider a system in which there are m sets in a cache and up to n requests allowed to access the cache in one cycle. The probability that all n requests are to the same set is: 1/(n*m). As n and m grow larger, the probability gets lower. For an event with a low probability of occurrence, lowering the cycle time is not the most optimal performance sensitive solution.

Embodiments in accordance with the present invention provide a cache replacement policy that is scalable with values of 1 (number of cache "ways") and n (number of requests allowed to access the cache in one cycle).

In accordance with embodiment of the present invention, characteristics of a cache replacement policy include:
1. L1 is included in L2.
2. Of the missing requests in L1, only one request can access L2 cache in a cycle.
3. Only one request is allowed to fill into L1 in one cycle.

FIG. 1 illustrates a data flow diagram 100 for a cache replacement policy, in accordance with embodiments of the present invention. The cache replacement policy may be implemented, for example via memory structures and logic, in a cache subsystem of a computer system, e.g., a microprocessor. A cache lookup request 105 is received at level 1 cache (L1) 110. The level 1 cache may be a Level 1 data cache (L1D) in some embodiments. The lookup request is a miss. A miss request 115 is sent from L1 to the L1 miss queue 120. The request does not pick an evict way at the time of the L1 miss. Rather, the missed request is forwarded 125 to L2 cache 130 and L1 pseudo least recently used (PLRU) array 140.

It is appreciated that PLRU array 140 is logically between L1 and L2. It may be beneficial to locate PLRU array 140 physically between such structures, as well. For example, the PLRU array 140 may be a component of the L2 memory structure. It is to be further appreciated that L2 cache 130 may comprise a pipeline coupled to, and servicing an L2 cache, which is not shown.

If the cache lookup request resides in the L2 cache 135, the request is forwarded to L1 110 via 136. If the cache lookup request misses L2 cache 130, the request is forwarded 135 to L2 miss queue 150. L2 miss queue 150 resolves the miss in a well known manner, for example, via request to a higher level cache or memory. It is appreciated that any fill to L2 cache 130, e.g., from a higher level cache or memory, is not shown.

In accordance with embodiments of the present invention, the missed request is also forwarded 145 from L1 PLRU array 140 to L2 miss queue 150. L2 miss queue 150 comprises additional storage locations 160 to record the L1 evict way. In this manner, the L1 miss can be "locked" in the L2 miss queue.

When a request 105 misses L1 110, it does not bother to pick an evict way at that time of L1 miss. Requests that miss L1, subsequently go to L2 cache 130.

The L2 cache 130, unlike L1 110, allows only one cache look up request in a cycle. Note that, with its high hit rate, L1 110 may benefit from a design to support multiple requests in one cycle. However, due to its large size and due to the low percentage of accesses, L2 cache 130 does not benefit from serving multiple requests in one cycle. When multiple requests miss L1 110, the requests go to L2 130, where they are serialized to access L2 130, one per cycle. In the L2 cache 130, the requests pick their evict way one at a time.

Because these requests that missed L1 110, all in the same cycle, pick their evict way, one at a time, in L2 130 over many, e.g., hundreds of subsequent cycles, it is possible for more than one request to pick the same way as its evict way. This is not desirable for performance reasons. For example, consider that Request0 picks way0 at time t0. Request1 then accesses L2 cache 130 some time later, for example at t10. Between t0 and t10, the PLRU array 140 for that set goes through many value changes and comes right back to where it was at time t0. This will result in Request1 also arriving at the same evict way value as that of Request0. Thus, Request1 will replace the cache line that was just filled into L1 110 by Request0, very quickly.

This potential problem is addressed by recording the evict way of Request0 in a structure, L2 miss cache 150, that is already present to track the requests that miss L1 110 and also miss L2 cache 130. For example, L2 miss cache 150 "remembers" which way has already been chosen as an evict way and that way becomes "locked," preventing that way from being used again, until it is unlocked. A locked evict way can not be chosen by any future requesters. A way is unlocked, when L2 cache 130 fills into L1 110.

Figure 2:
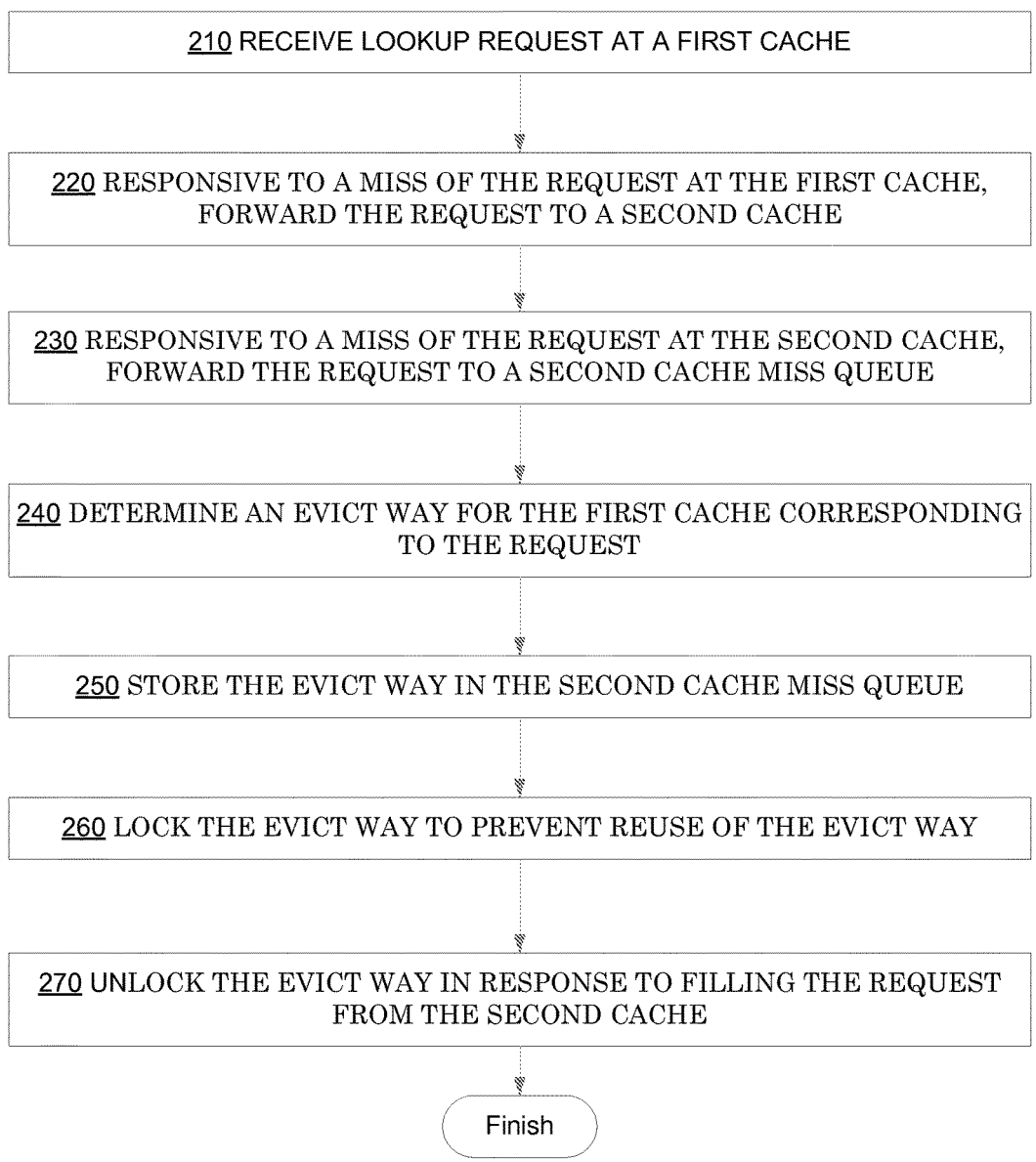
FIG. 2 illustrates a method, in accordance with embodiments of the present invention.

FIG. 2 illustrates a method 200, in accordance with embodiments of the present invention. At 210, a lookup request is received at a first cache. For example, one of lookup requests 105 is received at L1 110, as illustrated in FIG. 1. At 220, responsive to a miss of the request at the first cache, the request is forwarded to a second cache. The second cache is at a higher level of a memory hierarchy than the first cache, and may be inclusive of the first cache. For example, a miss request 115 is forwarded to L2 cache 130 via L1 miss queue 120, as illustrated in FIG. 1. It is appreciated that embodiments in accordance with the present invention are well suited to forwarding the missed request to a non-cache memory, e.g., a main memory.

At 230, responsive to a miss of the request at the second cache, the request is forwarded to a second cache miss queue. For example, the missed request is forwarded to L2 miss queue 150, as illustrated in FIG. 1. At 240, an evict way for the first cache corresponding to the request is determined. In accordance with embodiments of the present invention, the evict way may be determined in accordance with a pseudo least recently used cache replacement policy. In accordance with embodiments of the present invention, the evict way may be determined contemporaneously, e.g., on the same clock cycle, with the forwarding of the request to the second cache.

In 250, the evict way is stored in the second cache miss queue. For example, the evict way is stored in L1 evict way memory 160, as illustrated in FIG. 1.

In optional 260, the evict way is locked to prevent reuse of the evict way. In optional 270, the evict way is unlocked responsive to filling the request from the second cache (or memory). Accordingly, after the request is filled, the evict way may be reused. In accordance with embodiments of the present invention, such locking and unlocking of an evict way prevents the undesirable reuse of an evict way soon after it has already been used. Such near-term proximate reuse of an evict way may result in disadvantageous performance degradations of a cache subsystem.

Embodiments in accordance with the present invention are well-suited to addressing various types and levels of memory in a computer system memory hierarchy. Many of the exemplary embodiments presented herein describe or refer to a cache memory, as cache memories may benefit from the performance advantages of embodiments in accordance with the present invention. It is to be appreciated that such examples are not intended to be limiting, and those of ordinary skill in the art will be able to envision how to extend the disclosures presented herein to other memory types and structures, and that all such embodiments are considered within the scope of the present invention.

Embodiments in accordance with the present invention provide systems and methods for cache replacement policies. Embodiments in accordance with the present invention also provide for systems and methods for cache replacement policies that enable multiple cache look up requests in the same clock cycle. Further, embodiments in accordance with the present invention provide for systems and methods for cache replacement policies that are compatible and complementary with existing systems and methods for cache design and operation.

Various embodiments of the invention are thus described. While the present invention has been described in particular embodiments, it should be appreciated that the invention should not be construed as limited by such embodiments, but rather construed according to the below claims.

What is claimed is:

1. An apparatus comprising:
   a queue memory structure to queue cache requests that miss a second cache after missing a first cache; and
   additional memory associated with said queue memory structure to record an evict way of said cache requests for said first cache, wherein the evict way is a location in said first cache that serves as a destination for evicted data, wherein the apparatus is configured to lock said evict way recorded in said additional memory, wherein said locking prevents the evict way located in said first cache from being evicted.

2. The apparatus of claim 1 further to unlock said evict way responsive to a fill from said second cache to said first cache.

3. The apparatus of claim 1 wherein said second cache is inclusive of said first cache.

4. The apparatus of claim 1 further comprising:
   a third memory structure to record pseudo least recently used information of said first cache; and
   wherein said third memory structure is to be accessed by said first cache and said second cache.

5. The apparatus of claim 1 wherein said first cache is a Level 1 Data cache.

6. The apparatus of claim 5 wherein said second cache is a Level 2 cache.

7. A method comprising:
   receiving a lookup request at a first cache;
   responsive to a miss of said request at said first cache, forwarding said request to a second cache, wherein said second cache is at a higher level of a memory hierarchy than said first cache;
   responsive to a miss of said request at said second cache, forwarding said request to a second cache miss queue;
   determining an evict way for said first cache corresponding to said request;
   storing said evict way in said second cache miss queue, wherein the evict way is a location in said first cache that serves as a destination for evicted data; and
   locking said evict way, wherein said locking prevents the evict way located in said first cache from being evicted.

8. The method of claim 7 wherein said determining occurs in a same clock cycle said forwarding said request to said second cache.

9. The method of claim 7 further comprising: unlocking said evict way responsive to filling said request from said second cache.

10. The method of claim 7 wherein said determining further comprises determining said evict way in accordance with a pseudo least recently used cache replacement policy.

11. The method of claim 7 wherein said first cache is a Level 1 Data cache.

12. The method of claim 7 wherein said second cache is a Level 2 cache.

13. The method of claim 7 wherein said second cache is inclusive of said first cache.

14. A computer system comprising:
   a cache subsystem to choose an evict way for a missed request to a first level cache on the same clock cycle that said request accesses a next higher level of memory; and
   additional memory associated with said cache subsystem to record an evict way of said missed request for said first cache, wherein the evict way is a location in said first cache that serves as a destination for evicted data wherein the computer system is configured to lock said evict way recorded in said additional memory, wherein said locking prevents the evict way located in said first cache from being evicted.

15. The computer system of claim 14 wherein said next higher level of memory is a cache memory structure.

16. The computer system of claim 15 wherein said cache memory structure is inclusive of said first cache.

17. The computer system of claim 14 further to choose said evict way in accordance with a pseudo least recently used cache replacement policy.

* * * * *